United States Patent [19]
Oldham

[11] Patent Number: 5,417,609
[45] Date of Patent: May 23, 1995

[54] PORTABLE WILD GAME HANGING DEVICE

[76] Inventor: Gregory E. Oldham, 2421 McAdoo, Fort Worth, Tex. 76131

[21] Appl. No.: 296,679

[22] Filed: Aug. 26, 1994

[51] Int. Cl.⁶ .............................................. A22B 5/00
[52] U.S. Cl. .................................. 452/187; 457/192; 457/189
[58] Field of Search ............... 452/187, 188, 189, 191, 452/192

[56] References Cited

U.S. PATENT DOCUMENTS

| | | | |
|---|---|---|---|
| 458,018 | 8/1891 | Curtis | 452/189 |
| 3,854,168 | 12/1974 | Bradley | 452/189 |
| 4,806,063 | 2/1989 | York | 452/187 |
| 4,903,372 | 2/1990 | Jones | 452/187 |
| 5,049,110 | 9/1991 | Owens | 452/187 |
| 5,211,601 | 5/1993 | Cope | 452/187 |
| 5,288,265 | 2/1994 | Beason et al. | 452/187 |

*Primary Examiner*—Willis Little
*Attorney, Agent, or Firm*—Arthur F. Zobal

[57] ABSTRACT

A portable wild game hanging device is provided. The device has a J-shaped hook with transversely oriented base and arm portions. The hook may be secured about an elevated support, such as an elevated tree limb with the arm portion located over the elevated support. A pulley mechanism is supported under the arm portion of the hook on a rod which is coupled to the base portion of the hook. The pulley mechanism may be used to hoist and support a wild game animal. A pole is removably located in the hook in a pole receptacle which is coupled to the base portion of the hook. The pole may be used to lift the hook, rod, and pulley mechanism to an elevated support. The pole is formed of interlocking telescoping sections so the pole may be extended to lift the hook over an elevated support, and may be compressed for easy transport.

5 Claims, 3 Drawing Sheets

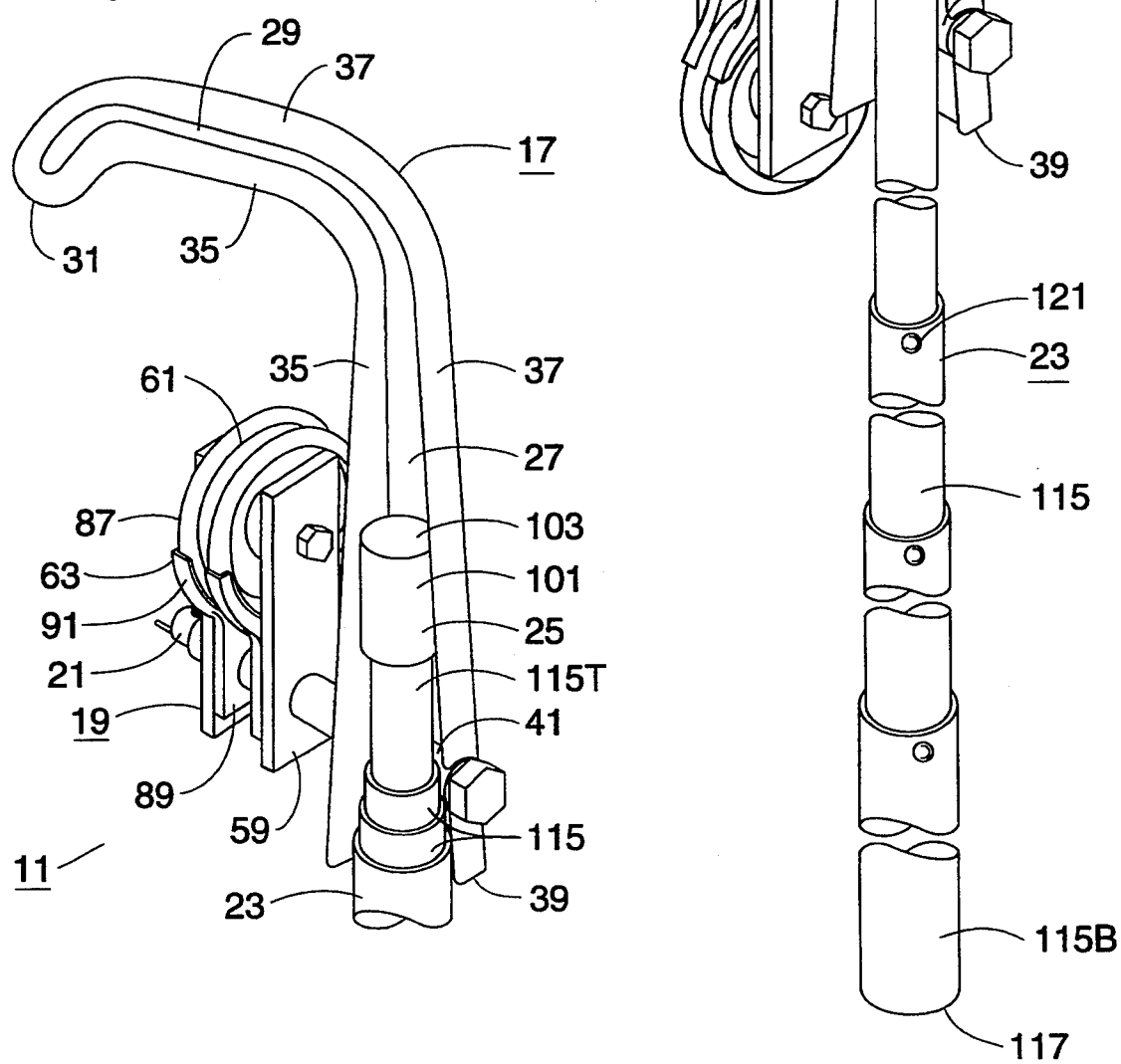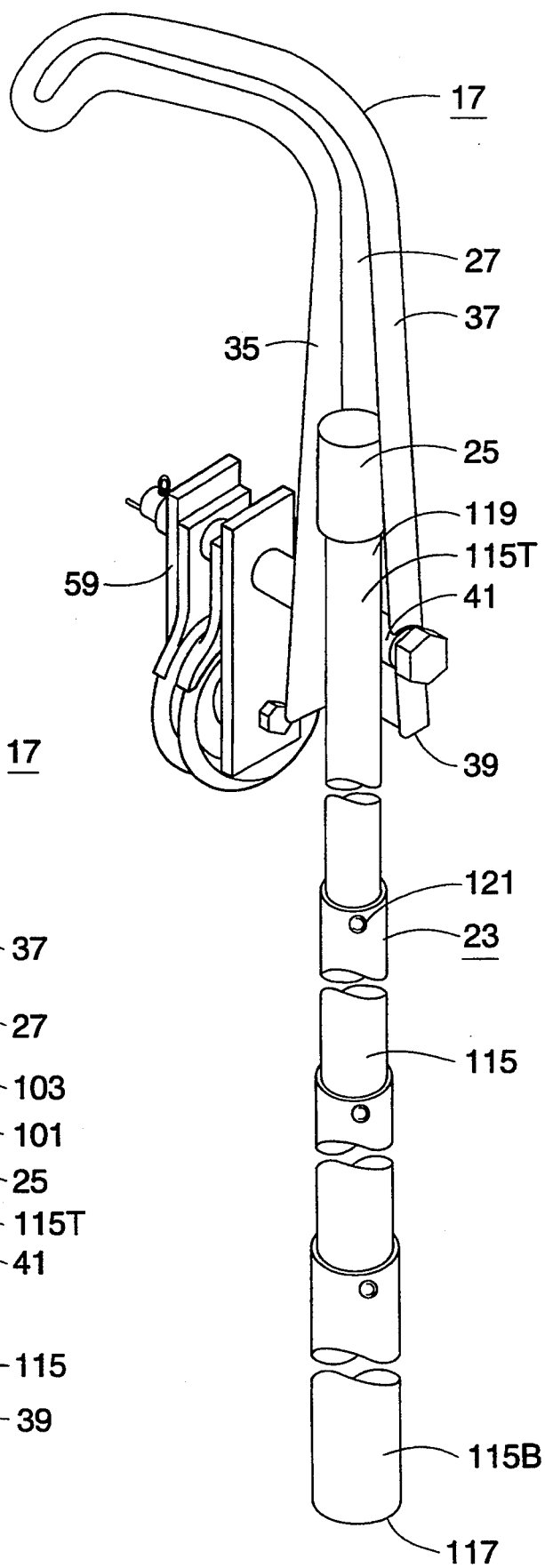

Fig. 6
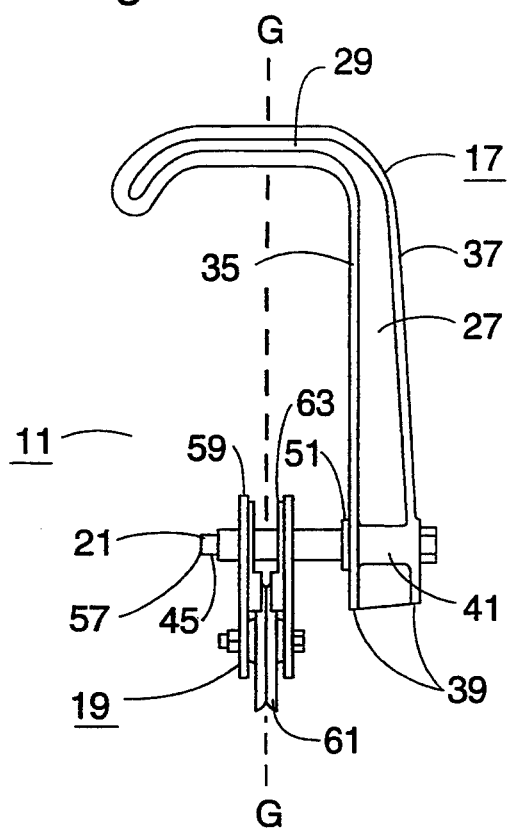
Fig. 8
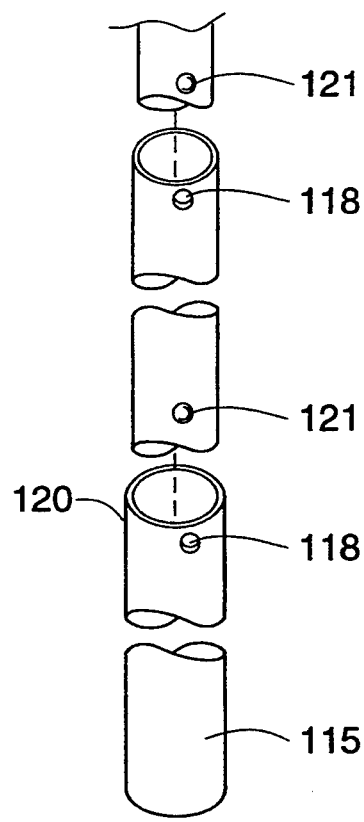
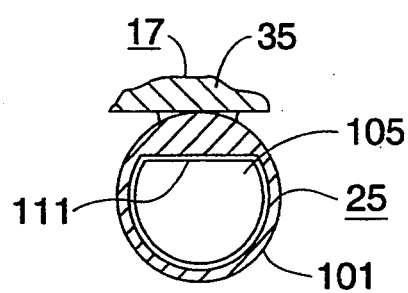
Fig. 7

PORTABLE WILD GAME HANGING DEVICE

BACKGROUND OF THE INVENTION

1. Field of the Invention

The present invention relates to a device for hanging wild game animals for skinning, gutting, and dressing, etc. and in particular to a portable device for use in the field that may be secured to elevated supports such as tree limbs.

2. Description of the Prior Art

After a wild game animal has been killed it is desirable to skin, gut, and dress the animal as soon as conventionally possible. The animal is hoisted to a suspended position to simplify these procedures. In the field, a block and tackle apparatus is commonly used to hoist the animal to a suspended position from a tree limb. Frequently, however, the tree limbs located around the area are too high to easily locate the block and tackle apparatus thereon, so the animal must be hauled to a suitable location for use of the block and tackle apparatus. Therefore, what is needed is a portable wild game hanging device which may be easily located on elevated and normally out of reach tree limbs or other supports.

SUMMARY OF THE INVENTION

It is an object of the invention to provide a portable wild game hanging apparatus that may be easily removably coupled to elevated supports such as tree limbs.

The apparatus has a J-shaped hook. The hook has a base portion and an integral arm portion extending transverse to the base portion. The hook is structured and arranged to be removably coupled to an elevated support with the arm portion located over the support. A pole receptacle is coupled to the base portion of the hook. A removable pole is located in the pole receptacle for lifting the hook over the support. A rod is coupled to the base portion of the hook extending transverse to the base portion beneath the arm portion of the hook. The rod is structured and arranged to support a suspended wild game animal. Plural mounting arms are supported on the rod with a pulley rotatable coupled between the mounting arms. The pulley may be used to hoist and support the game animal in a hanging position.

In one aspect of the invention the removable pole is comprised of interlocking telescoping pole sections which permit the pole to be extended into a lifting position or compressed into a transportable position.

BRIEF DESCRIPTION OF THE DRAWINGS

FIG. 1 is an isometric view of the wild game hanging device of the present invention with the pole in a compressed position.

FIG. 2 is an isometric view of the game hanging device with the pole in an extended position.

FIG. 6 is a side view of the game hanging device.

FIG. 7 is a cross-sectional view of the pole receptacle across the width of the pole receptacle.

FIG. 8 is an exploded view of the telescoping pole.

DESCRIPTION OF THE PREFERRED EMBODIMENTS

Figures 3, 4, 5:
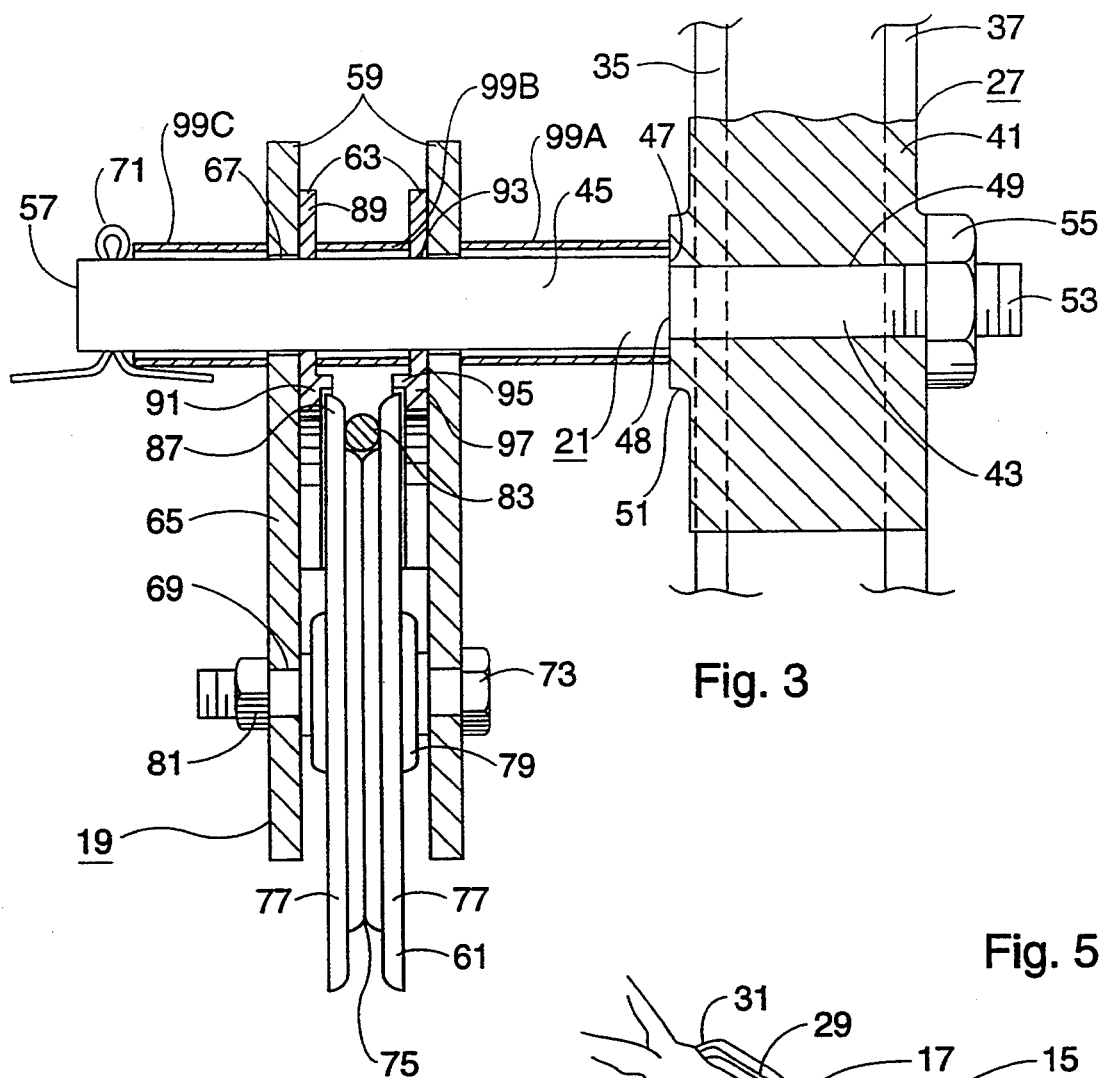
FIG. 3 is a cross-sectional view of the rod support and the pulley mechanism of the game hanging device.
FIG. 4 is a cross-sectional view of the pole receptacle of the game hanging device along the length of the pole receptacle.
FIG. 5 is an isometric view of the game hanging device positioned on a tree with a wild game animal suspended therefrom.

Referring now to FIGS. 1 and 5, the game hanging device of the invention is identified by reference numeral 11. The game hanging device 11 enables a game animal 13 to be hung from a support 15, such as a tree limb, so that the animal 13 may be gutted and dressed easily. The game hanging device 11 has a "J" shaped hook 17 which may be hooked over the support 15. A pulley mechanism 19 is coupled to a rod 21 extending from the hook 17 for hoisting game after the hook 17 is located about the support 15. The pulley mechanism 19 is positioned on the rod 21 so that the game hanging device 11 is balanced on the horizontal support 15 when the animal 13 is hoisted by the pulley mechanism 19. A telescoping pole 23 is removably located in a pole receptacle 25 coupled to the hook 17 for lifting the hook 17 to the elevated overhead support 15 which may be out of reach of most persons.

The hook 17 maintains the game hanging device 11 over the support 15. The hook 17 has a base 27 and an arm 29 which extends about 90 degrees from the base 27. The base 27 supports the rod 21 and the pulley mechanism 19, and supports the pole receptacle 25. The arm 29 extends over the support 15 to hold the game hanging device 11 thereon. The arm 29 is integrally coupled to the base 27 so that the hook 17 has a "J" shaped appearance. A hook end 31 of the arm 29 is angled with respect to the arm 29 to prevent the arm 29 from slipping off of the support 15.

The hook 17 is formed of a durable, heavy duty metal such as steel, aluminum, or iron so that the hook 17 may support a heavy game animal. The hook 17 is formed by bending a metal bar to form the hook end 31 with inner and outer hook members 35 and 37 extending therefrom. The inner and outer hook members 35 and 37 extend parallel along the arm 29 and along the base 27 to bar ends 39 at the bottom of the base 27.

As shown in FIGS. 1, 3, and 6, a rod support 41 is formed in the base 27 of the hook 17 for coupling the rod 21 to the base 27. The rod support 41 extends transversely between and is coupled to the inner and outer hook members 35 and 37 of the base 27 near the bar ends 39. Referring to FIG. 2, the inner and outer hook members 35 and 37 are slightly skewed from their parallel position near the bar ends 39. The rod support 41 extends between the rear of the inner hook member 37 so the pole 23 may extend between the hook members 35 and 37 adjacent the rod support 41 when the pole 23 is located in the pole receptacle 25.

Referring again to FIGS. 1, and 6, the rod 21 is coupled to the rod support 41 extending transversely outward (about 90 degrees) from the base 27 beneath the arm 29 positioned to support the pulley mechanism 19 beneath the arm 29. As shown in FIG. 3, the rod 21 is formed of a coupling section 43 and a support section 45 integrally coupled extending lengthwise, where the coupling section 43 has a slightly smaller diameter than the support section 45. The coupling section 43 and the support section 45 extend coaxially, and a shoulder 47 is formed at the juncture 48 of the coupling section 43 and the support section 45. The coupling section 43 is coupled to the base 27, and the support section 45 extends beneath the arm 29 to support the pulley mechanism 19. The rod 21 is formed of a heavy duty, durable metal such as steel, aluminum, or iron so that the rod 21 may support the pulley mechanism 19 and an animal 13 that may be hung on the pulley mechanism.

The coupling section 43 of the rod 21 is retained in a cylindrical bore 49 in the rod support 41 to couple the rod 21 to the base 27. The bore 49 extends through the rod support 41 transversely between the hook members 35 and 37. The relative diameter of the bore 49, coupling section 43, and support section 45 are such that the coupling section 43 may extend through the bore 49 while the support section 45 may not since the support section 45 is too large to fit into the bore 49. The rod 21 is positioned in the bore 49 with the coupling section 43 extending through the bore 49 with the shoulder 47 located abutting a shoulder 51 of the rod support 41 adjacent the inner hook member 35. A threaded end 53 of the coupling section 43 extends out from the bore 49 adjacent the outer hook member 37. A nut 55 secures the rod 21 in the rod support 41 between nut 55 and shoulder 47.

As shown in FIGS. 3 and 6, the support section 45 of the rod 21 extends outward beneath the arm 29 when the coupling section 43 is secured in the bore 49 of the rod support 41. The support section 45 extends under the arms 29 of the hook 17 from shoulder 47 to a support end 57 of the rod 21 transverse to the base 27 and roughly parallel to the arm 29. As shown in FIG. 6, the support section 45 of the rod 21 is somewhat shorter than the arm 29 of the hook 17, but still extends under the arm 29 for a substantial portion of the length of the arm 29.

Referring again to FIGS. 3 and 6, the pulley mechanism 19 is attached to the support section 45 of the rod 21 positioned beneath the arm 29 of the hook 17 so the hook 17 supports the pulley mechanism 19 and any load thereon when the hook 17 is located over a support. The pulley mechanism 19 is comprised of mounting arms 59 which are coupled to the rod 21, a pulley 61 which is rotatably mounted between the mounting arms 59 and pulley guides 63 located between the mounting arms 59 and the pulley 61. The mounting arms 59, pulley 61, and pulley guides 63 are preferably formed of a durable metal material such as steel, aluminium, or iron.

Referring now to FIG. 3, the mounting arms 59 of the pulley mechanism 19 are coupled to the rod 21 and support the pulley 61 on the rod 21. Each mounting arm 59 is formed by a plate 65 having a rod aperture 67 and a pulley mounting aperture 69 extending through the plate 65 centered at opposite ends of the plate. The support section 45 of the rod 21 extends through the rod aperture 67 of each mounting arm 59 to couple the mounting arms 59 to the rod 21. As shown in FIG. 2, the mounting arms 59 extend transverse to the rod 21 and hang substantially parallel to the base 27 of the hook 17. Referring back to FIG. 3, the rod apertures 67 of the mounting arms 59 have a diameter that is slightly larger than the diameter of the support section 45 of the rod 21 so that the mounting arms 59 may swivel about the rod 21 in response to pressure upon the pulley 61. The mounting arms 59 may be swivelled 360 degrees about the rod 21 and may extend towards the arm 29 (see FIG. 1) or away from the arm 29 (see FIG. 2). Referring again to FIG. 3, a lock pin 71 extends through the rod 21 to prevent the mounting arms 59 from sliding off the rod.

The mounting arms 59 are positioned to rotatably receive the pulley 61 therebetween. The mounting arms 59 are spaced apart from each other on the rod 21 to rotatably receive the pulley 61 therebetween while being joined together about the pulley 61 by pulley bolt 73 located extending through pulley apertures 69. The distance between the pulley aperture 69 and the rod aperture in each mounting arm 59 is slightly greater than the radius of the pulley 61 so the pulley 61 may rotate about the pulley bolt 73 extending through the center of the pulley 61 without interference from the rod 21.

The pulley 61 is rotatably mounted between mounting arms 59 extending transverse to the rod 21. The pulley 61 is a conventional, commercially available pulley having a channel 75 extending between rim walls 77, which have a pulley shaft 79 extending centrally therethrough about which the pulley 61 may rotate. The shaft 79 has an aperture extending therethrough and house a bearing member. Pulley bolt 73 extends through the pulley apertures 69 in the mounting arms 59 and through the pulley shaft 79 to mount the pulley 61 between the mounting arms 59. A pulley nut 81 attached to the pulley bolt 73 secures the pulley 61 between the mounting arms 59. A rope 83 or cord may be rotatably supported in the channel 75 of the pulley 61 to hoist a game animal into a hanging position by rotating the pulley 61 between the mounting arms 59 (See FIG. 5).

Referring to FIGS. 1 and 3, pulley guides 63 may be secured to the rod 21 inside the mounting arms 59 extending about rim wall edges 87 of the pulley 61 to steady the pulley 61 between the mounting arms 59 and maintain the cord 83 in the channel 75. Each pulley guide 63 has a platelike mounting section 89 which is integrally coupled to a rim 91. As shown in FIG. 3, the support section 45 of the rod 21 extends through a guide aperture 93 in the mounting section 89 of each pulley guide 63 to mount the pulley guide 63 on the rod 21 adjacent to a mounting arm 59. The guide apertures 93 are slightly larger in diameter than the support section 45 of the rod 21 so the pulley guides 63 may be swivelled about the rod 21 in conjunction with the mounting arms 59 of the pulley mechanism 19.

Referring back to FIGS. 1 and 3, the mounting section 89 of each pulley guide 63 extends from about the rod 21 to the rim 91 of the pulley guide. Each rim 91 extends in a short arc about a portion of the rim wall edge 87 of the pulley 61. As shown in FIG. 3, each rim 91 has an arm 95 which extends over a rim wall edge 87, and a leg 97 which extends beside a rim wall 77 adjacent a mounting arm 59. The arms 95 and legs 97 of the rims 91 are slightly separated from the rim wall edges 87 and the rim walls 77, respectively, of the pulley 61 so the pulley 61 may rotate freely within the rims 91. The rims 91 keep the pulley 61 from excessive wobbly or vertical movement during operation of the pulley 61.

In a preferred embodiment, as shown in FIG. 3, spacer sleeves 99A, 99B, and 99C are located around portions of the support section 45 of the rod 21 adjacent the pulley mechanism 19 to situate the pulley mechanism 19 along a line extending through the center of gravity of the device 11 (shown as line G—G in FIG. 6) so the device 11 will be well balanced on a support 15 when the hook 17 is located over the support 15.

As shown in FIG. 3, the spacer sleeves 99A, 99B, and 99C are cylindrical metal sleeves which fit around the support section 45 of the rod 21. The sleeves 99A, 99B, and 99C may also be formed of a durable plastic or of metal. An inner spacer sleeve 99A is located around the rod 21 abutting the shoulder 51 of the rod support 41 and extending to abut the mounting arm 59 of the pulley mechanism 19 closest to the rod support 41. An outer spacer sleeve 99C is located around the rod 21 abutting the lock pin 71 at the support end 57 of the rod 21 and extending to abut the mounting arm 59 closest to the support end 57 of the rod 21. A middle spacer sleeve 99B is located around the rod 21 extending between and abutting the pulley guides 63. The diameters of the spacer sleeves 99A, 99B, and 99C are larger than the diameters of the rod apertures 67 of the mounting arms 59 and the guide apertures 93 of the pulley guides 63 so the mounting arms 59 and pulley guides 63 are held in place between the spacer sleeves 99A, 99B, and 99C. The relative lengths of the inner spacer sleeve 99A and the outer spacer sleeve 99C position the pulley mechanism 19 along line G.

Referring now to FIGS. 1, 4, and 7, the pole receptacle 25 is coupled to the base 27 of the hook 17 so the hook 17 may receive the pole 23 in order to be lifted to elevated supports 15. The pole receptacle 25 has a cylindrical wall 101 and a top wall 103 integrally coupled together to form a cylindrical cap. As shown in FIG. 1, the cylindrical wall 101 of the pole receptacle 25 is coupled to the inner hook member 35 above the rod support 41 to secure the pole receptacle 25 between the inner and outer hook members 35 and 37. In a preferred embodiment the pole receptacle 25 is formed of a heavy duty durable metal material welded to the inner hook member 35.

The pole receptacle 25 removably receives the pole 23 therein. As shown in FIG. 4, the pole receptacle 25 has a pole receiving cavity 105 extending between the cylindrical wall 101 and the top wall 103. A pole receiving opening 107 extends through the cylindrical wall 101 at the bottom 109 of the pole receptacle 25 communicating with the pole receiving cavity 105. The pole 25 may be removably located in the pole receiving cavity 105 through the pole receiving opening 107.

When the pole 23 is located in the pole receptacle 25 the pole 23 may be rotated to position the hook 17 over a support 15. The pole 23 and the pole receptacle 25 are designed to prevent the pole 23 from slipping in the pole receptacle 25 upon rotation of the pole 23. Referring now to FIGS. 4 and 7, the pole receiving cavity 105 and the pole receiving opening 107 are substantially cylindrical with a flat edge portion 111. The shape of the insertion end 113 of the pole 23 corresponds to the cavity 105 as shown in FIG. 7. The flat edge portion 111 of the pole receiving cavity 105 and the matching insertion end 113 of the pole 23 keep the pole 23 from slipping in the pole receptacle 25 upon rotation of the pole 23.

As shown in FIGS. 1 and 2, the pole 23 is comprised of telescoping sections 115 which move between a retracted position (FIG. 1) and an extended position (FIG. 2). The pole 23 is located in its retracted position for easy transport, and is located in its extended position to lift the hook 17 to an elevated support 15. The telescoping sections 115 are cylindrical metal tubes. The diameter of each cylindrical section 115 is progressively smaller than the preceding section as the pole 23 extends from its base 117 to its tip 119 so each section 115 may be received into its adjacent larger section and may receive its adjacent smaller section therein. The interconnected sections 115 may be pulled to an extended position to increase the length of the pole 23, or may be pushed into a compressed position to reduce the length of the pole 23.

As shown in FIG. 2, each section 115 except the tip section 115T has a conventional spring loaded locking button 121 for removably holding the adjacent smaller section in an extended position. Referring to FIG. 8, each section 115 except the base section 115B has a lock button receiving aperture 118 for receiving a lock button 121 of the adjoining smaller section. The lock button receiving aperture is positioned near the end 120 of each section 115. The lock button receiving aperture receives the lock button 121 of the adjoining smaller section when the section 115 is fully extended. A spring in the lock button 121 activates the lock button 121 to extend into the lock button receiving aperture 118 thereby locking the smaller section 115 in an extended position. Each section 115 may be placed in an extended position as desired to adjust the height of the pole 23.

As shown in FIG. 1, each section 115 except the base section 115B may be located in a compressed position within its adjacent larger section. A section 115 may be moved from its extended position by applying compressive force against the section 115. The force presses the lock button 121 out of the lock button receiving aperture and pushes the section 115 into its adjoining larger section.

Referring now to FIGS. 1, 2, and 5, operation of the game hanging device 11 will be now be described. Initially, a suitable support 15 such as a tree limb is selected for hanging the game hanging device 11 and the game animal 13, which may be a deer. The support 15 must be of suitable height to permit the animal 13 to hang above the ground from the pulley mechanism 19 of the device 11. The pole 23 is placed in the pole receptacle 25 and the pole sections 115 are extended and located in place until the pole 23 is sufficiently long to locate the device 11 on the support 15. The pole 23 is then used to place the device 11 on the horizontal support 15, lifting and rotating the hook 17 until the hook arm 29 is placed over the support 15. The pole 23 is then removed from the pole receptacle 25.

As shown in FIG. 5, after the hook 17 is located on the support 15, the animal 13 is hung from the pulley mechanism 19. A rope 83 coupled to a hanger 123 secured to the animal 13 is extended from the hanger 123 through the channel 75 of the pulley 61 to extend around the pulley 61. Force is exerted on the rope 83 to rotate the pulley 61 so the animal 13 is hoisted off of the ground. The pulley 61 is positioned on the rod 21 so the device 11 is balanced on the horizontal support 15 as the animal 13 is hoisted by the rope 82 and pulley 61. A free end 125 of the rope 83 is then secured about a stable object 127, such as a tree trunk, to secure the animal 13 in a hanging position form the device 11. The animal 13 may then be gutted and dressed.

After the animal 13 is gutted and dressed, the animal may be lowered back to the ground. The free end 125 of the rope 83 is removed from the stable subject 127 and the animal 13 is lowered to the ground by slowly playing the rope 83 through the pulley 61. The pulley 61 rotates to lower the animal 13. The rope 83 may then be removed from the pulley 61.

The device 11 is then removed from the support 15 by locating the pole 23 in the pole receptacle 25 and lifting the hook 17 of the device 11 off of the support 15. The pole 23 is then compressed into a retracted position for easy transport.

The foregoing disclosure and the showings made in the drawings are merely illustrative of the principles of this invention and are not to be interpreted in a liming sense.

I claim:

1. An apparatus for hanging an animal, comprising:
   a J-shaped hook having a base portion and an integral arm portion extending transversely to said base portion, said hook being structured and arranged to be removably coupled to an elevated horizontal support with said arm portion located over said horizontal support;
   a pole receptacle coupled to said base portion of said hook;
   a removable pole locatable in said pole receptacle for lifting said hook over said support;
   a rod coupled to said base portion of said hook extending transverse to said base portion beneath said arm portion of said hook,
   plural mounting arms supported on said rod;
   a pulley rotatably coupled between said mounting arms for hoisting and supporting said animal into a hanging position, said pulley mechanism being positioned on the rod so that the game hanging device is balanced on the horizontal support when the animal is hoisted by the pulley mechanism.

2. The apparatus of claim 1, wherein:
   said pole is comprised of interlocking telescoping pole sections which permit said pole to be extended into a lifting position or compressed into a transportable position.

3. The apparatus of claim 1, wherein:
   said mounting arms are positioned on said rod to locate said pulley along a line that passes through the center of gravity of said apparatus so that said apparatus is balanced on said horizontal support when an animal is hung from said pulley.

4. The apparatus of claim 3, further comprising:
   spacer means located around said rod adjacent said mounting arms for maintaining said mounting arms in a position on said rod to locate said pulley along a line that passes through the center of gravity of said apparatus.

5. The apparatus of claim 3, wherein:
   said pole is comprised of interlocking telescoping pole sections which permit said pole to be extended into a lifting position or compressed into a transportable position.

* * * * *